(12) United States Patent
Loebig

(10) Patent No.: US 6,904,138 B1
(45) Date of Patent: Jun. 7, 2005

(54) METHOD FOR UPDATING SUBSCRIBER-RELATED DATA IN A TELECOMMUNICATION NETWORK

(75) Inventor: Norbert Loebig, Darmstadt (DE)

(73) Assignee: Siemens Aktiengesellschaft, Munich (DE)

(*) Notice: Subject to any disclaimer, the term of this patent is extended or adjusted under 35 U.S.C. 154(b) by 351 days.

(21) Appl. No.: 10/049,889

(22) PCT Filed: Aug. 16, 2000

(86) PCT No.: PCT/DE00/02763
§ 371 (c)(1),
(2), (4) Date: Feb. 19, 2002

(87) PCT Pub. No.: WO01/13652
PCT Pub. Date: Feb. 22, 2001

(30) Foreign Application Priority Data

Aug. 18, 1999 (DE) .......................................... 199 39 057

(51) Int. Cl.7 ............................................... H04M 3/42
(52) U.S. Cl. ............................ 379/201.03; 379/201.12
(58) Field of Search ....................... 379/201.03, 201.12, 379/221.11, 229, 230, 88.22, 88.25, 88.27; 709/221, 246

(56) References Cited

U.S. PATENT DOCUMENTS

| 5,390,335 | A | | 2/1995 | Stephan et al. ............. 709/221 |
| 6,169,794 | B1 | * | 1/2001 | Oshimi et al. ......... 379/221.09 |
| 6,182,045 | B1 | * | 1/2001 | Kredo et al. ................ 704/270 |
| 6,240,174 | B1 | * | 5/2001 | Silver ......................... 379/230 |

FOREIGN PATENT DOCUMENTS

WO        WO 99/3307        7/1999

* cited by examiner

Primary Examiner—Benny Tieu
(74) Attorney, Agent, or Firm—Morrison & Foerster LLP

(57) ABSTRACT

The invention discloses data records which are stored in one of a plurality of service devices, and an address list which keeps the other service devices which likewise keep the data record, with a change which is initiated by the customer being carried out on one of the service devices which keep that data record, and this service device reports the change to the other service devices.

14 Claims, 3 Drawing Sheets

V₁ ———— direct recording
V₂ ———— single update
V₃ ———— mass update (after repair)

METHOD FOR UPDATING SUBSCRIBER-RELATED DATA IN A TELECOMMUNICATION NETWORK

CLAIM FOR PRIORITY

This application claims priority to International Application No. PCT/DE00/02763 which was published in the German language on Aug. 16, 2000.

TECHNICAL FIELD OF THE INVENTION

The invention relates to a method of updating subscriber-related data in a network.

BACKGROUND OF THE INVENTION

Local and trunk switching centers generally have access to external or integrated devices for producing announcements. Such announcements may be simple system announcements (for example: "number unobtainable") or announcements composed of individual fragments (for example: "This subscriber's telephone number has changed, the new telephone number is 123456"). Even complete dialogs for identification and activation of the desired function are offered in conjunction with the handling of intelligent network features (for example: calling card service) or for controlling subscriber service features by the subscriber (for example: block outgoing calls), with the aid of an announcement technique and DTMF/speech recognition.

Until now, the announcement and speech recognition data records required for this purpose have been subject to changes only very rarely, but the present-day competition between network operators has led to the frequency of changes to these data records having increased to a major extent:

For example, announcements must have up-to-date and informative contents. (For example: up-to-date advertising announcements from the company for callers who are waiting for a free line to this company's call center). It must be possible to produce dialogs for new services quickly, and this necessarily results in a more frequent need to change the announcement element and the keyword stores for the speech recognizer. In the same way, up-to-date information for fax retrieval when a large number of subscribers are calling at the same time must be produced on a daily basis (for example: television programs with additional information by fax retrieval).

In order to achieve the maximum level of flexibility, the network operators and their customers can, using the prior art, generate the databases associated with them by means of their own infrastructure (for example the customer's PC environment) and without any devices in the switching network, and can then supply these (for example by means of an ISDN dialed connection or via the Internet) to the announcement and dialog devices in the telecommunications network. By way of example, the major customer of a network operator can in this way update his announcement by transmitting the announcement (which has been produced on his PC) with the latest advertising content via a dialed connection to an announcement device, or simply by speaking the new announcement to the announcement device, using a telephone terminal.

In order to make it possible to produce such information, which is provided from devices in the telecommunications network, with sufficiently little blocking for large scale retrieval, this information is offered simultaneously by a large number of devices in the telecommunications network, with these devices also being distributed physically. The switching center which is associated, for example independently of the source, with a current connection request, in order to provide an announcement, dialog or fax retrieval, is in general accessed on the basis of a standard telephone number, which is applicable throughout the network, with functions being implemented by the intelligent network. This can be done, for example, based on the shortest route for the connection between the subscriber and the selected switching center providing the desired announcement, fax or dialog function.

The updating processes mentioned above relate to the databases stored in these devices. The updating process is preceded by an authorization check using a personal identification number (PIN), in the same way as any associated dialog with the user. After the updating process, a trial activation can be carried out, which is likewise controlled by the operator (for example monitoring the announcement or trial activation of the speech recognizer for new keywords). After this, the new database can be activated throughout the network. At this time, at the latest, it is necessary to make the updated data available both in the same switching center and throughout the network to all the announcement, fax retrieval and dialog machines associated with that respective network customer.

This results in the following technical problem:

How can the database (which is loaded in an announcement, fax retrieval or dialog device in a switching center for the purpose of trial activation) for an individual network customer be made available in the same switching center and throughout the network to all the announcement, fax retrieval and dialog devices associated with this customer, without the customer explicitly needing to address the devices involved and having to carry out and monitor sequential transmission of the updated database at the customer end? A further problem that arises in this case is that fault situations in the network (for example failure of a switching center or of a device that is involved) or changes to the network topology (for example extensions to the announcement capacity in the switching centers) can affect the operator interface of the announcement, fax retrieval and dialog customer, and may thus necessitate specific action. A further problem is that time restrictions (for example changes relating only to specific times of the day) or dependencies on the network operator (for example the use of maintenance personnel) exist and, finally, there is a risk of data being lost.

In the prior art, this has resulted in the installation of service devices in order to solve this problem. These are referred to as intelligent peripherals IP and are integrated either in the network nodes or in the peripherals of the switching centers.

However, a solution such as this results in the problem that changes which a network customer wants to make to his database are loaded exclusively by the network operator into the entire network, since only the network operator is able to address those switching centers which are relevant for the respective network customer and the large number of peripheral devices which are contained in these switching centers and have an integrated IP function. This results in time delays, out-of-date data, and dependency on the network operator.

SUMMARY OF THE INVENTION

In one embodiment of the invention, there is a method for updating subscriber-related data records, which are stored locally in a number of service devices in a switching network. The method includes, for example, providing administrative measures for each data record which is stored in one of the service devices, to store a list of the addresses of the other service devices which store the data record and addressing each data record in a standard manner throughout the network, wherein a change to the data record is carried out on one of the service devices which stores the corresponding data record, and the service device reports the change throughout the network to the other service devices.

In another aspect of the invention, the service devices are included in the peripherals of a communications system.

In another aspect of the invention, the service devices are included in the network nodes of a switching network.

In yet another aspect of the invention, the lists are updated in the course of administration of the switching network or of the communications system.

In another aspect of the invention, an old data record is stored until the initiation of the network-wide or switching-center-wide updating by the customer.

In another aspect of the invention, the data record is updated by the service devices which initially have a new data record during a background process for successive updating of the other service devices.

In still another aspect of the invention, repeated cyclic updating attempts are performed in the background process if the service devices to be updated are inaccessible or the attempts are unsuccessful.

In another aspect of the invention, the method includes utilizing connections which have been made temporarily between the service devices in order to update the data records.

In another aspect of the invention, an update-specific communication occurs between the service devices via a switching-center-internal message distribution system or, throughout the network, via ISDN user-to-user signaling, or switching-center internally and throughout the network via the Internet Protocol.

In yet another aspect of the invention, a number of data records are updated via one updating connection.

In another aspect of the invention, the updating format is defined in the course of the communication between the service devices.

In another aspect of the invention, the time required for updating is reduced by multiple channel connection and/or multiple starting of the background process.

In still another aspect of the invention, the method includes updating a time stamp to the update to prevent the current data record from being overwritten by older data records when a number of updating background processes are carried out at the same time.

In another aspect of the invention, activation of the background processes of service devices which are still in operation is carried out to update service devices which are being taken back into operation again after repair.

BRIEF DESCRIPTION OF THE DRAWINGS

The invention will be explained in more detail in the following text with reference to an exemplary embodiment, which is illustrated in the figures, in which.

DETAILED DESCRIPTION OF THE PREFERRED EMBODIMENT

In one embodiment of the invention, information can be updated from the customer end easily, reliably, at the right time and in a user-friendly manner.

One advantage of the invention is that administrative measures are taken to ensure that, for each data record which is stored in one of the service devices, a list is kept of the addresses of the other service devices which likewise keep the data record, that each data record can be addressed in a standard manner throughout the network, and that a change, initiated by the customer, to the data record is carried out on one of the service devices which keep that data record, and the service device reports this change throughout the network to the other service devices. This is associated with the advantage that changes to the announcement, fax and dialog functions can be carried out not only by the network operator but also, in particular, by the customer himself.

Figure 1:
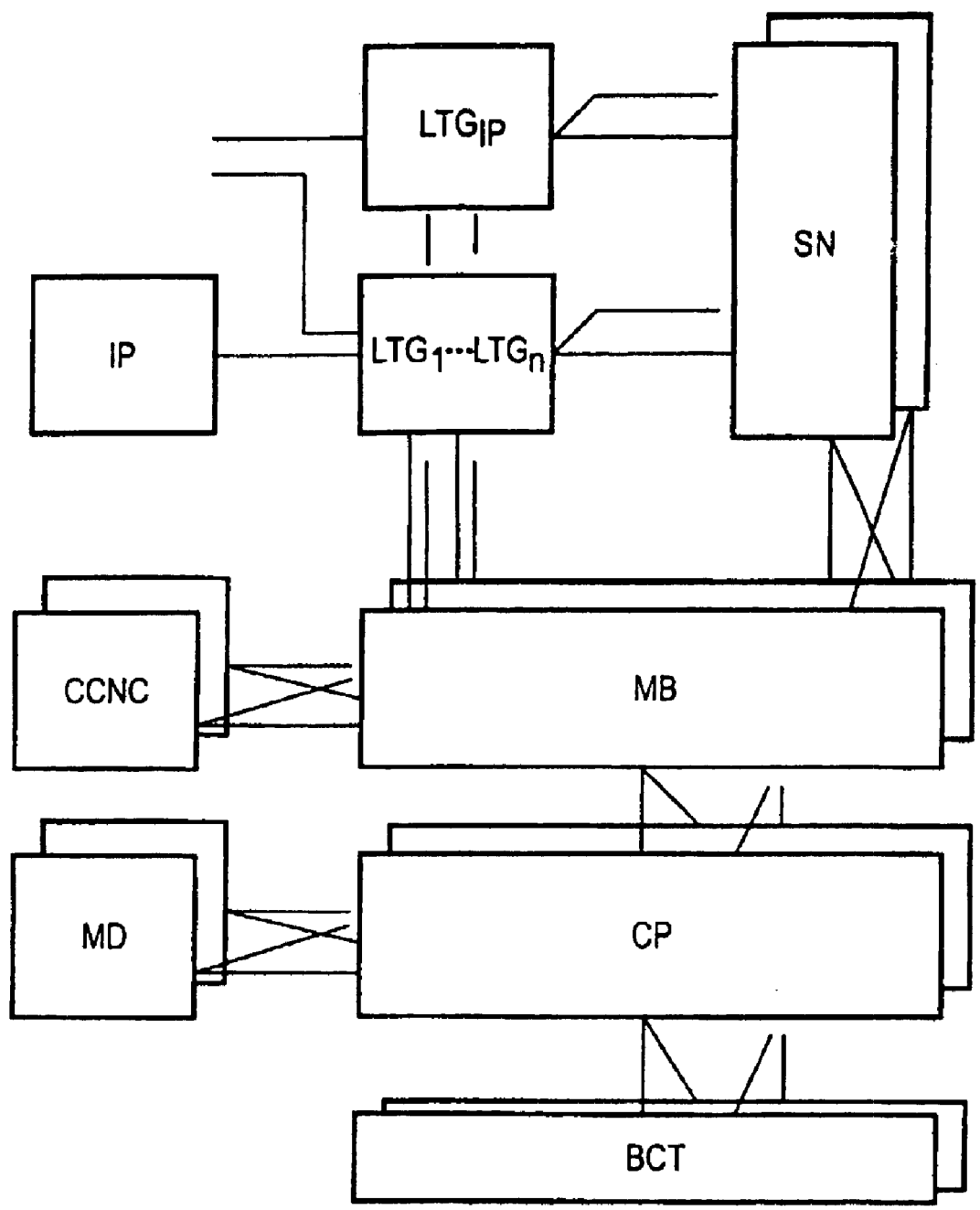
FIG. 1 shows the typical architecture of a communications system.

FIG. 1 shows the typical architecture of a communications system with unduplicated peripheral devices. A communications system such as this comprises peripheral devices $LTG_1, \ldots LTGN_n$ (access devices for subscribers or lines), a central computer platform CP, a message distribution device MB, and other, central units (switching matrix SN, protocol termination devices CCNC (for example #7), background memory MD, control devices BCT).

The peripheral devices $LTG_1, \ldots LTG_n$ carry out switching tasks associated with the speech channels of the peripheral device. They include switching, operating and administrative programs as well as the data information associated with the device, such as the access situation, signaling, authorizations, telephone numbers, individual characteristics of connecting lines and subscriber connections, as well as the extent state and configuration of the peripheral device. Devices IP which have the function of service devices are integrated as part of an integrated solution in one of the peripheral devices $LTG_{IP}$.

The central computer platform CP is used for coordinating control of the setting up and clearing of connections and for the reactions to administrative configuration changes and configuration changes resulting from faults. The peripheral devices $LTG_1, \ldots LTG_n$ are connected to one another via the message distribution system MB, and are connected to the common computer platform CP. The other central system components provide the switching system with specific functions, for example for the connection of voice channels, the processing of signaling protocols, the provision of the operator interface, or the storage of bulk data.

Figure 2:
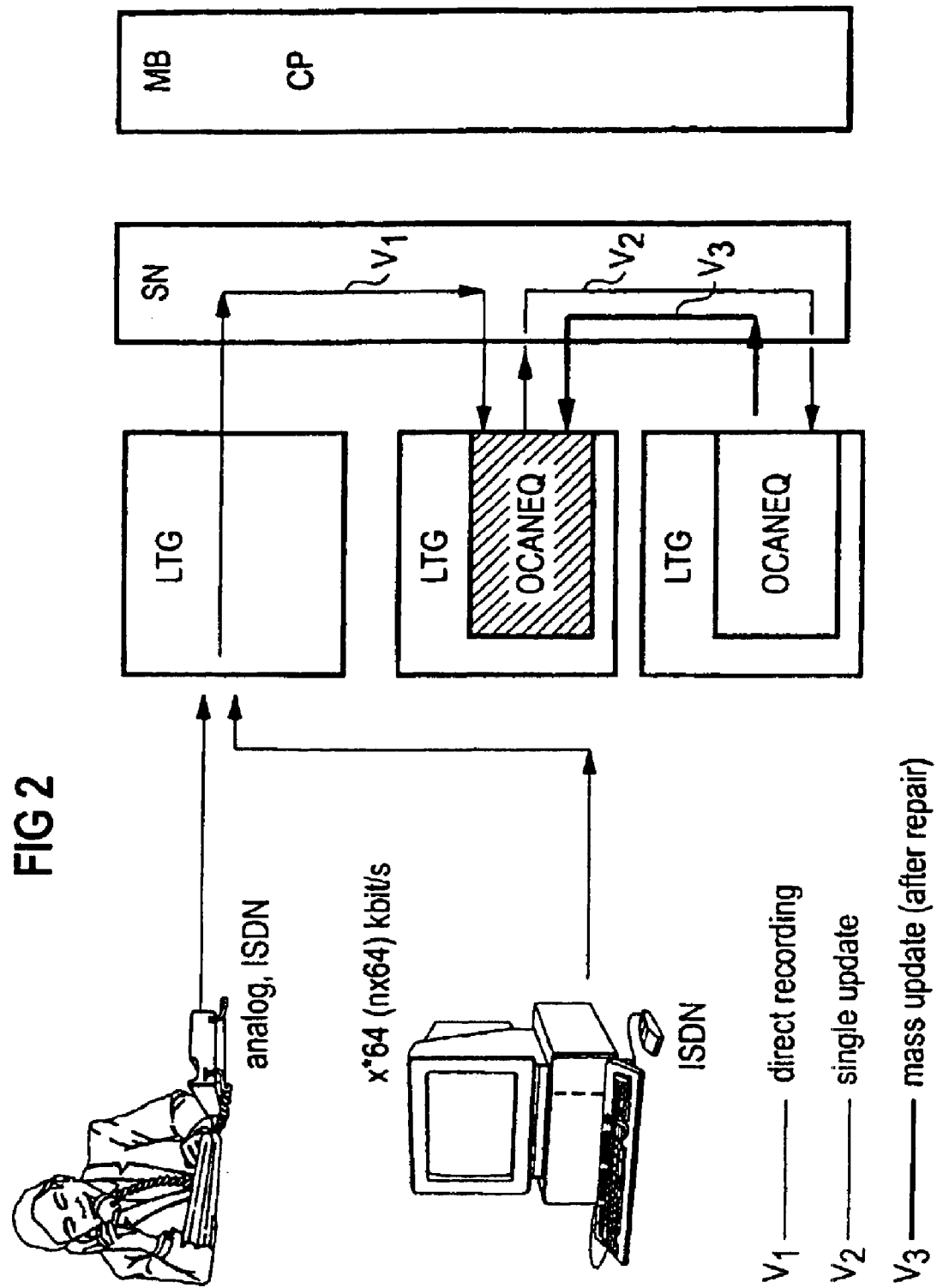
FIG. 2 shows an architecture of a service device which is integrated in a switching center.

FIG. 2 shows how the service devices IP are inserted in a peripheral device $LTG_{IP}$ in the communications system. In this case, the service devices IP are in the form of integrated announcement devices OCANEQ, with whose aid a further integrated announcement device OCANEQ is updated and customer announcements are made. Announcement, dialog and speech recognition functions are also integrated in the peripheral device $LTG_{IP}$.

In FIG. 2, the process of setting up a connection $V_1$ to an integrated announcement device OCANEQ via an analog connecting line or an ISDN connecting line is controlled by a subscriber (direct recording). The process of setting up connections can likewise be controlled separately via a PC. Once the speaking of the announcement text to the integrated announcement device OCANEQ has been completed, the latter sets up a further connection $V_2$ to a further integrated announcement device OCANEQ in a further peripheral device LTG (single update). The integrated announcement device OCANEQ arranged there is updated using the announcement text. If the original integrated announcement device OCANEQ has failed, a further connection $V_3$ can be set up to once again store the transmitted announcement text back in the original integrated announcement device OCANEQ on startup (mass update after repair).

One refinement of the invention provides for the service devices to be integrated as external service devices IP or external intelligent peripherals IP—referred to as IPs, for short, in the following text—in the switching nodes.

When setting up a new database, deleting an existing database or making changes to the network topology (for example upgrading the devices in the network which provide the desired function), the relevant address lists in the associated IPs are updated within the switching center and/or throughout the network. Each IP thus knows the address of the other IPs which are associated with each customer-specific data record and keep this data record. Furthermore, the data record for each relevant IP can be addressed in a standard manner throughout the network.

During operation,. the customer-specific data records are called up on the basis of widely differing criteria (for example as a function of the load or as a function of the source) via the IPs which keep that data record. If a customer wishes to update his data record (for example to load the current advertisement for today), then, in principle, he can be routed to each of the IPs which keep this data record, for the purpose of updating, trial activation and subsequent activation of the data record throughout the network. This is particularly advantageous for providing an updating functionality which is available as widely as possible. The previous data record remains fully available throughout the network during the loading of the updated data record and trial activation.

If the customer is satisfied with the trial activation, the initiates the updating of the data record throughout the network. This means that the new data record is made available to be called up in the network in the IP addressed for the purpose of updating, and the previous data record is deactivated or deleted. (The newly loaded announcement is thus, in the simplest case, available at this stage via the IP that handles the updating process while, in contrast, the further IPs, which provide this customer announcement, are still in the short term playing the previous announcement until they are updated.)

A background process in the first IP to be updated now carries out the task of updating the data record to be updated in the other IPs. On the basis of the list (mentioned above) of the other IPs with this data record, this IP now sets up successive temporary connecting paths to a further IP in which said data record is to be updated. Such connecting paths may be dialed connections (that is to say, in principle, one IP successively calls all the other IPs that are affected) or switching operations, within the switching center, between integrated IPs, that is to say usages of a port of a relevant further IP.

Once the updating has been carried out, connections such as these are cleared down once again. If it has been possible to set up a connection, then the actual updating, that is to say the transmission of the amended data record in the further IP, requires communication between the IPs that are involved. For example, the IP that is being addressed should preferably know the index of the data record to be updated. The nature of the update may also need to be signaled (for example, in the case of announcements, the playing of the start and end tone, or protocol-protected transmission via PPP). It is also preferable to transmit the readiness of the addressed IP for updating, as well as success acknowledgement, failure acknowledgement and repetition request, between the two IPs. Network-wide user-to-user messages and/or reports carried within the switching center via the message distribution system may also be used for such information interchange between the relevant IPs. If it is not possible to contact an IP to be updated, as can occur, for example, due to hardware failures, then the background process mentioned above will start updating attempts once again, cyclically. An updating connection which has been switched to another IP can be used to update a number of data records. This connection is expediently cleared only when there are no further data records for this IP, which is setting up the connection, to be updated in the direction of the further IP.

When long data records need to be distributed between a large number of IPs, the time required for a complete network-wide update may rise in an unacceptable manner. In cases such as this, the updating connection may be given a wider bandwidth (for example n×64 kbit/s), and/or a number of other IPs may be updated at the same time.

If a customer amends his data record within a short time period, then it is feasible for a further update to the same data record to be initiated by a second IP even before completion of the first network-wide or switching-center-internal update of the data record by a first IP.

From the point of view of a further, third IP to be updated, the already obsolete data record could thus in principle overwrite the more recent customer data record that had already been stored here, as a result of the background processes for updating of this data record being active at the same time. In order to preclude such situations, the time at which the updated data recorded is loaded by the customer is also stored as a time stamp in the data describing the data record. Since an obsolete data record should never overwrite a more recent data record, it is possible to compare the associated time stamps to ensure that only the actually up-to-date data record is disseminated throughout the network and within the switching center.

When an IP that has failed becomes available again after being repaired, it can explicitly request that its databases be updated by one of the other IPs by setting up an updating connection (possibly with a wider bandwidth), and by corresponding communication with the further IP.

Figure 3:
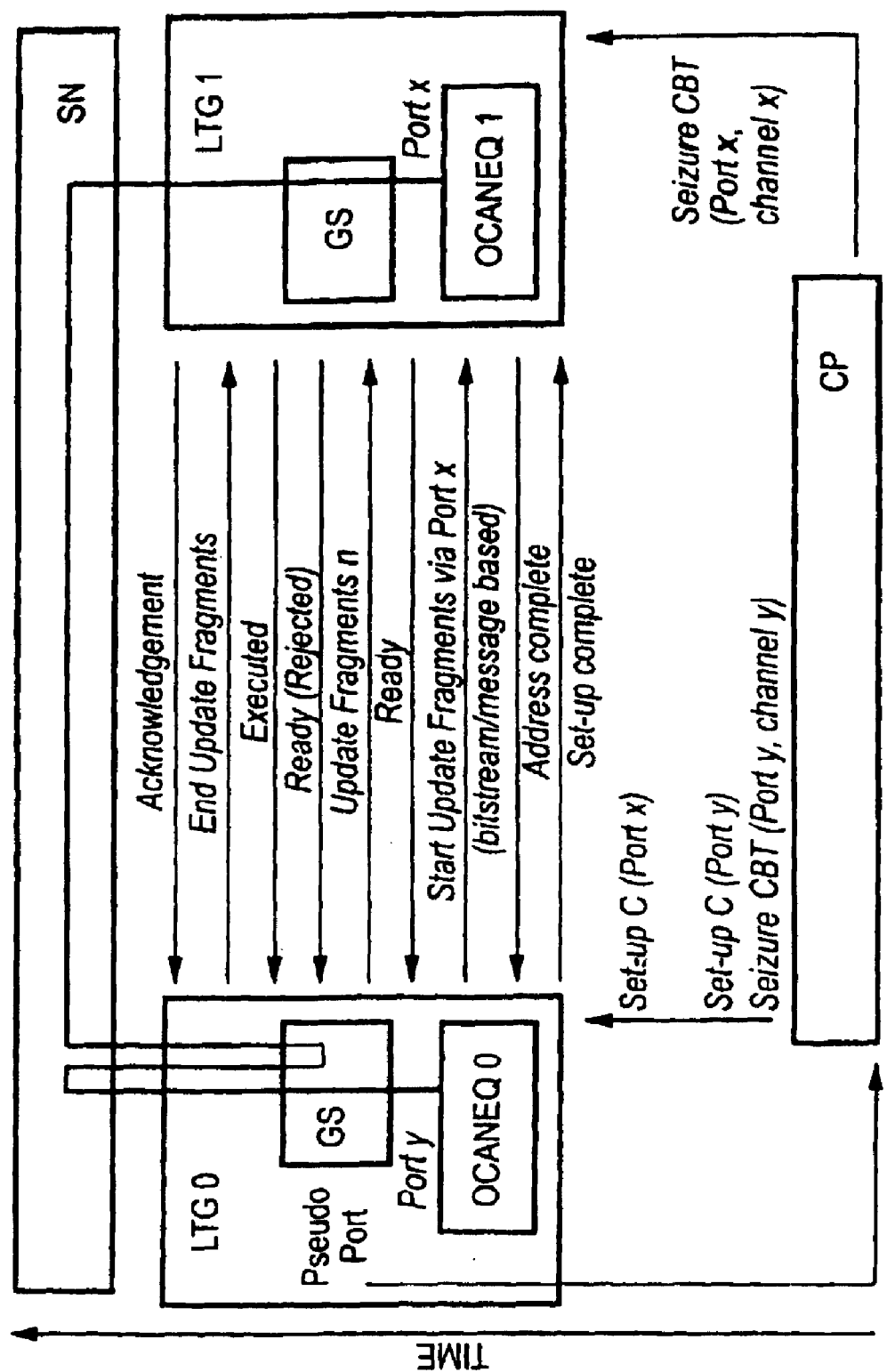
FIG. 3 shows the connection processes and internal communication between integrated service devices.

FIG. 3 shows the possible switching processes and internal communication between integrated IPs for updating customer-specific announcement data records. In particular, this indicates how the connection $V_2$ is set up from the integrated announcement device $OCANEQ_0$ in the peripheral device $LTG_0$ to the integrated announcement device $OCANEQ_1$ in the peripheral device $LTG_1$. In this case, the peripheral device $LTG_0$ first of all makes use of a port on the integrated announcement device $OCANEQ_0$ and a port on the integrated announcement device $OCANEQ_1$. These connection requests are processed by the central control device CP. This results in the control device CP transmitting to the peripheral device $LTG_0$ the set-up C (port x), set-up C (port y) and seizure CBT (port y, channel y) messages. Furthermore, the control device CP transmits the seizure CBT (port x, channel x) message to the peripheral device $LTG_1$. The peripheral device $LTG_0$ then transmits the set-up complete message to the peripheral device $LTG_1$, which sends an acknowledgement message address complete to the peripheral device $LTG_0$.

The actual updating of the newly addressed announcement text is then carried out by the peripheral device $LTG_0$. To do this, it sends the message Start Update Fragments via Port x (bit-stream/message based) to the peripheral device $LTG_1$. This message is acknowledged by a ready message. After this, the peripheral device $LTG_0$ sends the update fragment n message to the peripheral device $LTG_1$, which acknowledges this message with the message ready or rejected. Finally, an executed message is transmitted to the peripheral device $LTG_0$ which, as the final action, transmits the end update fragments message to the peripheral device $LTG_1$, which terminates the updating sequence, with this being acknowledged by an acknowledgement message. The connection $V_2$ which has been set up between the integrated announcement devices $OCANEQ_0$, $OCANEQ_1$ via local switching matrices GS arranged in respective peripheral devices $LTG_0$, $LTG_1$, is then cleared.

What is claimed is:

1. A method for updating subscriber-related data records, which are stored locally in a number of service devices in a switching network, comprising:

providing administrative measures, for each data record which is stored in one of the service devices, to store a list of the addresses of the other service devices which store the data record; and addressing each data record in a standard manner throughout the network, wherein a change to the data record is carried out on one of the service devices which stores the corresponding data record, and the service device reports the change throughout the network to the other service devices.

2. The method as claimed in claim 1, wherein the service devices are included in the peripherals of a communications system.

3. The method as claimed in claim 1, wherein the service devices are included in the network nodes of a switching network.

4. The method as claimed in claim 1, wherein the lists are updated in the course of administration of the switching network or of the communications system.

5. The method as claimed in claim 1, wherein an old data record is stored until the initiation of the network-wide or switching-center-wide updating by the customer.

6. The method as claimed in claim 1, wherein the data record is updated by the service devices which initially have a new data record during a background process for successive updating of the other service devices.

7. The method as claimed in claim 6, wherein repeated cyclic updating attempts are performed in the background process if the service devices to be updated are inaccessible or the attempts are unsuccessful.

8. The method as claimed in claim 1, further comprising utilizing connections which have been made temporarily between the service devices in order to update the data records.

9. The method as claimed in claim 1, wherein an update-specific communication occurs between the service devices via a switching-center-internal message distribution system or, throughout the network, via ISDN user-to-user signaling, or switching-center internally and throughout the network via the Internet Protocol.

10. The method as claimed in claim 1, wherein a number of data records are updated via one updating connection.

11. The method as claimed in claim 10, wherein the updating format is defined in the course of the communication between the service devices.

12. The method as claimed in claim 11, wherein the time required for updating is reduced by multiple channel connection and/or multiple starting of the background process.

13. The method as claimed in claim 12, further comprising updating a time stamp to the update to prevent the current data record from being overwritten by older data records when a number of updating background processes are carried out at the same time.

14. The method as claimed in claim 6, wherein activation of the background processes of service devices which are still in operation is carried out to update service devices which are being taken back into operation again after repair.

* * * * *